United States Patent
Nou et al.

(10) Patent No.: US 9,327,751 B2
(45) Date of Patent: May 3, 2016

(54) ASSEMBLIES AND METHODS FOR HANDLING, TRANSPORTING AND/OR POSITIONING COMPONENT PARTS

(71) Applicant: EMBRAER S.A., Sao Jose dos Campos/SP (BR)

(72) Inventors: Lallo Kametada Nou, Sao Jose dos Campos (BR); Marcelo Andrey de Albuquerque Bonifacio, Sao Jose dos Campos (BR)

(73) Assignee: EMBRAER S.A., São José dos Campos—SP (BR)

( * ) Notice: Subject to any disclaimer, the term of this patent is extended or adjusted under 35 U.S.C. 154(b) by 274 days.

(21) Appl. No.: 13/886,575

(22) Filed: May 3, 2013

(65) Prior Publication Data
US 2014/0328655 A1    Nov. 6, 2014

(51) Int. Cl.
*B62B 3/04* (2006.01)
*B64F 5/00* (2006.01)
*B66C 1/42* (2006.01)

(52) U.S. Cl.
CPC .............. *B62B 3/04* (2013.01); *B64F 5/0009* (2013.01); *B64F 5/0036* (2013.01); *B66C 1/42* (2013.01)

(58) Field of Classification Search
CPC .......... B62B 3/04; B66C 1/42; B64F 5/0036; B62D 65/024; B62D 65/026; B60P 3/11
USPC ......... 414/373, 399, 800, 809, 816, 449, 446, 414/664, 626, 11, 498; 269/17; 280/79.3, 280/79.7, 47.35, 43.23; 254/10 R
See application file for complete search history.

(56) References Cited

U.S. PATENT DOCUMENTS

| | | | |
|---|---|---|---|
| 2,492,172 A | | 12/1949 | Morris |
| 2,712,874 A | * | 7/1955 | Murray .................... 414/743 |
| 2,889,136 A | | 6/1959 | Prete, Jr. |
| 4,199,182 A | | 4/1980 | Sunesson |
| 6,234,432 B1 | * | 5/2001 | Piller et al. .................. 248/129 |
| 6,654,987 B1 | | 12/2003 | Wu |
| 6,866,463 B2 | * | 3/2005 | Riordan et al. ............. 414/498 |
| 7,004,483 B1 | * | 2/2006 | McEntee ................. 280/47.35 |
| 7,017,940 B2 | * | 3/2006 | Hatfull ........................ 280/652 |
| 7,494,312 B2 | * | 2/2009 | Valette et al. ................ 414/11 |
| 2003/0190219 A1 | * | 10/2003 | Young ............................ 414/11 |

FOREIGN PATENT DOCUMENTS

| DE | 198 16 030 | 10/1999 |
|---|---|---|
| DE | 101 48 590 | 4/2003 |
| DE | 102 52 896 | 5/2004 |

* cited by examiner

*Primary Examiner* — Kaitlin Joerger
(74) *Attorney, Agent, or Firm* — Nixon & Vanderhye P.C.

(57) ABSTRACT

Assemblies and methods for the handling, transporting and/or positioning component parts include a jig assembly for supporting a component part is provided with an elongate spar assembly, a plurality of rib assemblies attached to the spar, and a plurality of tensionable strap assemblies operatively associated with the rib assemblies for capturing and holding the component part against the rib assemblies. The strap assemblies may include a strap ratchet mechanism and a strap, so that operation of the strap ratchet mechanism allows strap slack to be removed thereby tensioning the strap. The jig assembly may be positioned and oriented by suspension cables and a hoist mechanism to allow it to be removably connected to a moveable transport dolly.

31 Claims, 14 Drawing Sheets

ASSEMBLIES AND METHODS FOR HANDLING, TRANSPORTING AND/OR POSITIONING COMPONENT PARTS

FIELD

The embodiments disclosed herein relate generally to assemblies and methods for handling, transporting and/or positioning component parts, especially large-scale component parts for aircraft that may be somewhat fragile and/or flexible before final assembly (e.g., large-scale fuselage panels, flight control surfaces and the like).

BACKGROUND

In various branches of the manufacturing industry, during the several stages of production processes, there is a need to handle raw materials, parts and assemblies until the formation of the final product. The transportation and handling of such parts (components) in each stage depends on the type of process, size of the components, as well as their physical characteristics, such as dimensions, geometry, weight, and fragility.

Certain components can be rather fragile depending on their shape, size, structural integrity and/or material of fabrication. For example, components formed from glass, plastics coatings (whether or not reinforced), flat or shaped surface composites, and metallic materials with very thin thickness can be fragile prior to installation into the final product. As such, the transport and handling of such parts (components) can be a major manufacturing challenge, especially when the size of the components increases (e.g., as may be the case for aircraft components).

The extent to which the dimensions of these components increases, also increases the complexity of handling and transport, requiring the use of specialized equipment to assist in this activity such as treadmills, support cars, forklifts, cranes, structures equipped with suction and vacuum to cranes.

A diverse range of devices is currently available for handling and transporting components. However, when dealing with the handling characteristics of components with relatively large dimensions (for example, parts having a surface area of greater than 30 $m^2$), the devices that may be employed depend on the component parts being structurally resistant, in order to be hoisted, raised, transported without any damage to the material. If the need to handle large components with larger dimensions but without great structural strength or integrity is considered, (e.g., such as may be the case with components formed of glass or flexible coatings), the currently available devices can be even more complex, costly and expensive. In addition, such conventional devices generally allow for only a very restricted use and thus are not sufficiently flexible to be used at several stages of a production process.

Exemplary devices and techniques currently available for the transport and positioning of component parts during a manufacturing process can be found in DE 10252896A1, DE 10148590A1, U.S. Pat. No. 2,492,172 and DE 19816030 (the entire contents of each being expressly incorporated hereinto by reference). While these various proposals are suitable for their intended uses, there is still a need for improvements in the handling, transporting and positioning of component parts during a manufacturing process. It is therefore toward providing improvements to the same that the embodiments of the present invention are directed.

SUMMARY

The disclosed embodiments herein are directed toward assemblies and methods for the handling, transporting and/or positioning component parts. According to some embodiments, a jig assembly for supporting a component part is provided with an elongate spar assembly, a plurality of rib assemblies attached to the spar, and a plurality of tensionable strap assemblies operatively associated with the rib assemblies for capturing and holding the component part against the rib assemblies.

The strap assemblies may include a strap ratchet mechanism and a strap, wherein the strap has one end fixed to an end of a respective rib assembly and another end operatively engaged with the strap ratchet mechanism thereof so that operation of the strap ratchet mechanism allows strap slack to be removed thereby tensioning the strap. Certain embodiments will include an upright rigid mounting plate associated with the rib assemblies with a base of the strap ratchet mechanism being fixed to the mounting plate.

The rib assemblies may be provided with a spine plate having an upright connection flange connected to the spar assembly. Cushion members may thus be carried by the spine plate according to certain embodiments so as to cushion the component part strapped to the jig assembly.

In order to allow the jig assembly to be removably connected to a transport dolly, some embodiments may include L-shaped support brackets adapted to be received within tubular sleeve supports of the dolly.

According to embodiments that may be especially configured to support an aircraft component part, the spar assembly may be comprised of a pair of outwardly divergent spar members joined to one another at a central junction thereof. One of the rib assemblies may thus be positioned cross-wise of the spar assembly at the central junction of the divergent spar members, while a pair of rib assemblies are positioned at a respective terminal end of each of the spar members. In such an embodiment, at least one rib assembly may optionally be positioned crosswise relative to the spar members between the end rib assemblies and the central rib assembly.

A transport dolly for supporting the jig assembly may also be provided according to some embodiments and may include a platform base, casters associated with the platform base to allow for rolling movement across a surface, a plurality of upright support posts fixed to and extending upwardly from the platform base, and support sleeves attached to an upper end of the support posts. The support sleeves may be tubular, for example, so as to receive therein a part of the support bracket of the jig assembly. In such a form, therefore the combination of the jig assembly and the transport dolly may be employed to position the component part strapped to the former to be maneuvered and positioned as may be desired.

A method of positioning a component part during a manufacturing process is also contemplated by providing a jig assembly, strapping a component part to the jig assembly, and moving the jig assembly so as to position the component part strapped thereto. According to some embodiments, the component part is strapped to the rib assemblies by operating a strap ratchet mechanism so as to tension a strap associated with the strap assemblies and thereby capture the component part between the tensioned strap and the rib assemblies.

As noted briefly above, the jig assembly may be oriented relative to a transport dolly and thereafter coupled to the transport dolly once the jig assembly has been orientated appropriately. Such orientation of the jig assembly may be accomplished by suspending the jig assembly by support cables and then moving the support cables to position the jig assembly and the component part strapped thereto by operating a winch assembly operatively associated with a central support cable to thereby cause the jig assembly and the component part strapped thereto to be reoriented between substantially horizontal and substantially vertical positions. Thereafter, lowering of the jig assembly while the jig assembly and the component part strapped thereto are in a substantially vertical position will then bring the jig assembly into coupling engagement with the transport dolly (e.g., by engaging the L-shaped support brackets of the jig assembly with the tubular support sleeves of the transport dolly).

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

The methods, systems and devices will be described below in reference to the handling, transportation and ultrasonic inspection of a component aircraft part. Specifically, the following description is based on a specific need in the aerospace industry to handle a coating sheet component of an aircraft wing structure as it is processed through various fabrication stages, including removing the component from a tooling mold, as well as subsequent cutting, drilling, ultrasonic inspection and delivery of the component for final installation. It will of course be recognized by those skilled in this art that the description below is related to an exemplary embodiment of the invention. Thus, the invention may be embodied usefully for handling, transporting and/or positioning of component parts outside of the aerospace industry, for example in virtually any other industry for manufactured goods, such as automotive, naval, or civil defense and security where needed when handling parts with large dimensions and/or high fragility.

Figure 1:
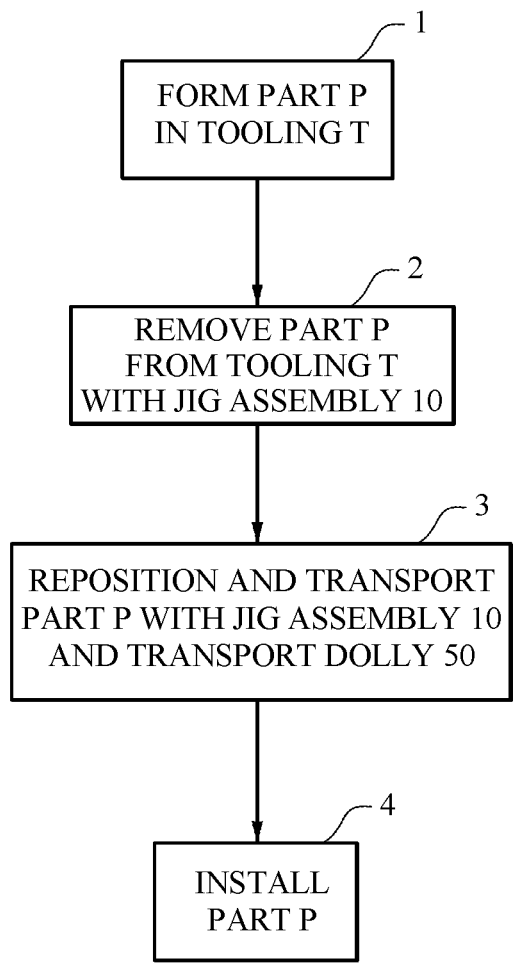
FIG. 1 is schematic block flow diagram of a typical component fabrication and installation technique.

Accompanying FIG. 1 depicts a flow diagram for the fabrication and installation of a component part P for an aircraft, e.g., a coating sheet component of an aircraft wing structure. In this regard, the component part P may first be fabricated in a suitable tooling structure T as depicted in step 1. Once formed, the component part P may then be removed from the tooling T in step 2 with the assistance of the jig assembly 10 to be described in greater detail below. The jig assembly 10 is thereafter employed in step 3 along with a transport dolly 50 (to be described in greater detail below) so as to reposition the part P for further processing (e.g., subsequent cutting, drilling, ultrasonic inspection and delivery of the component for final installation). Thereafter, in step 4, the part P may be installed onto the aircraft once all post-fabrication processing has been accomplished.

Figure 2:
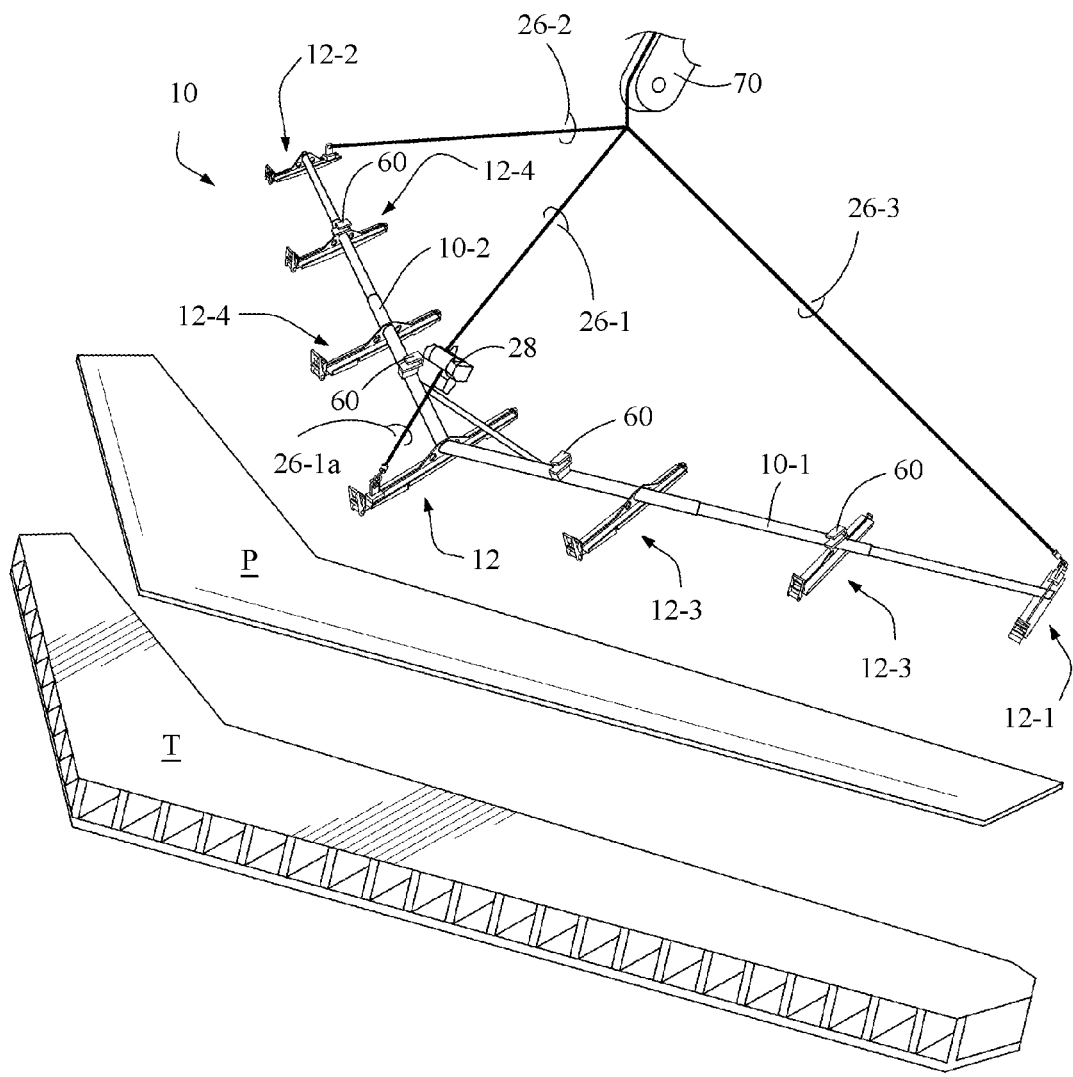
FIG. 2 is a top perspective exploded view of an exemplary tooling for the component part, the component part formed by the tooling and the jig assembly for removing the part from the tooling and repositioning the removed part for further processing.

An exploded top front perspective view of the tooling T, component part P and the jig assembly 10 is depicted in FIG. 2. As shown, the tooling T provides a means by which the component part P is fabricated. For example, if the component part P is in the form of a composite sheet for an aircraft wing coating, the tooling T provides suitable support and contour to form the sheet from raw materials (e.g., fiber reinforced resin materials). Once the part P is fabricated, however, the jig assembly 10 aids in its removal from the tooling T and repositioning for further processing.

Figure 3:
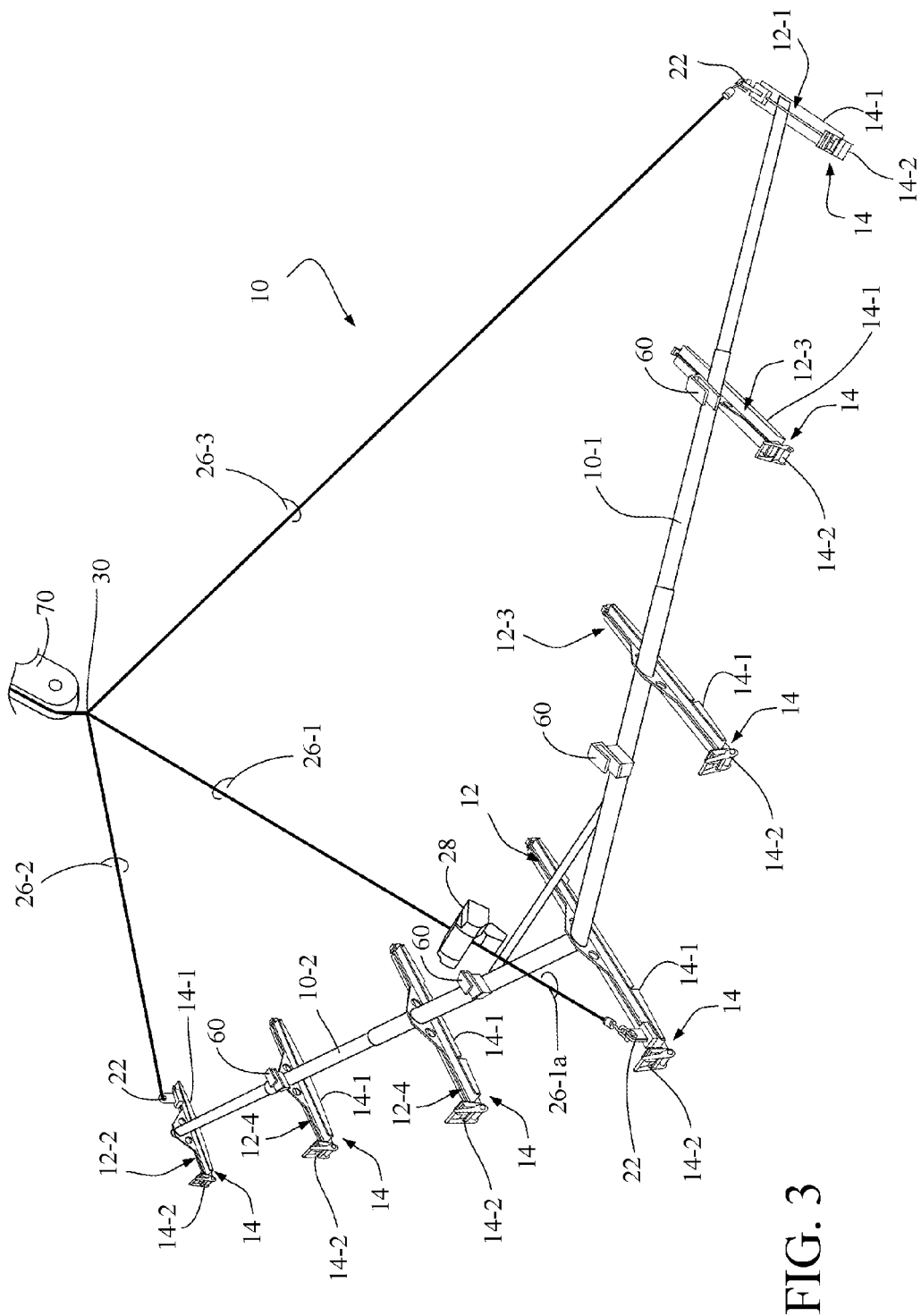
FIG. 3 is a top perspective view of the component jig assembly and supporting suspension cables.
Figure 4:
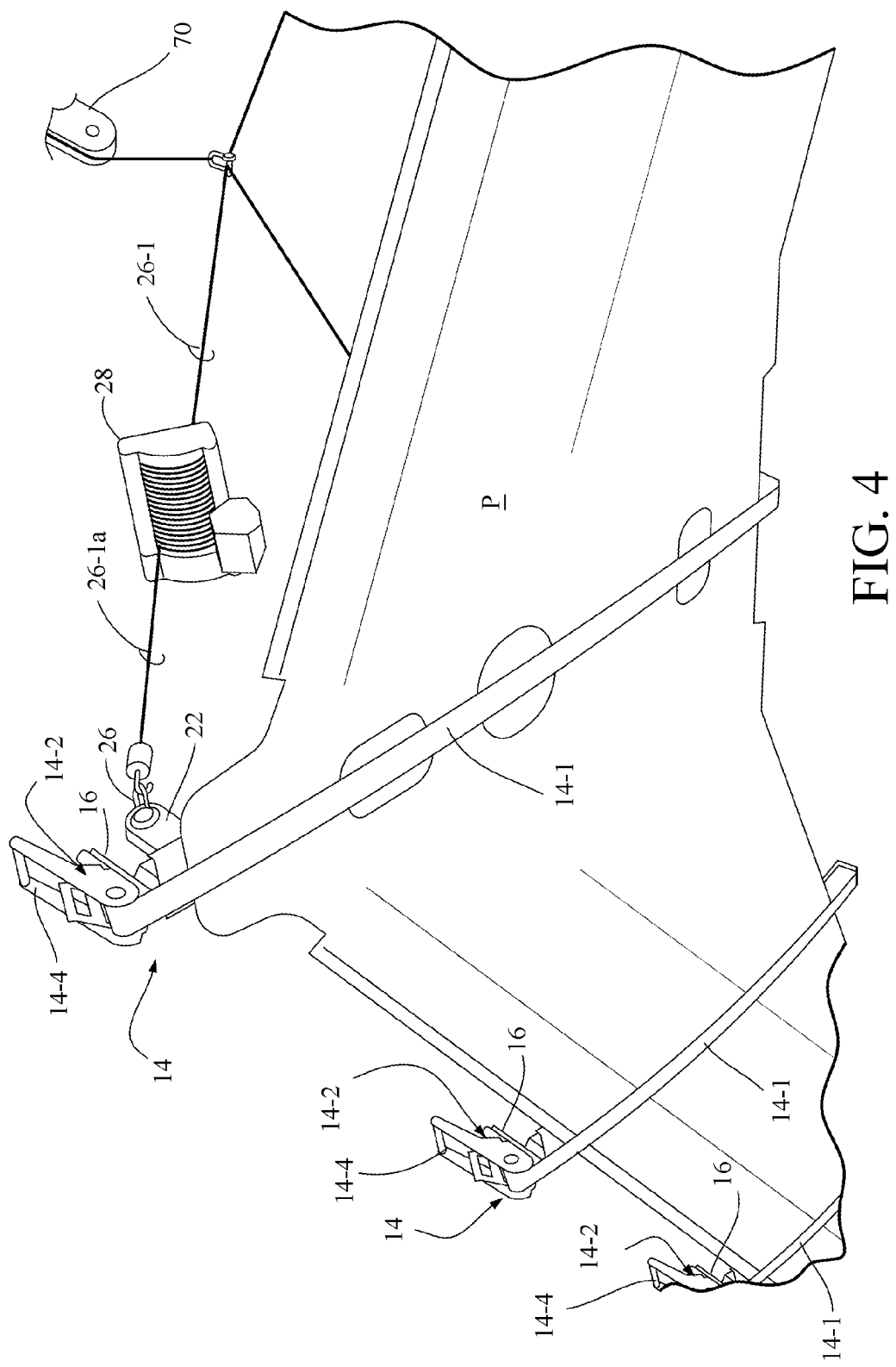
FIG. 4 is a partial bottom perspective view of the jig assembly with a component part supported thereby.
Figure 5:
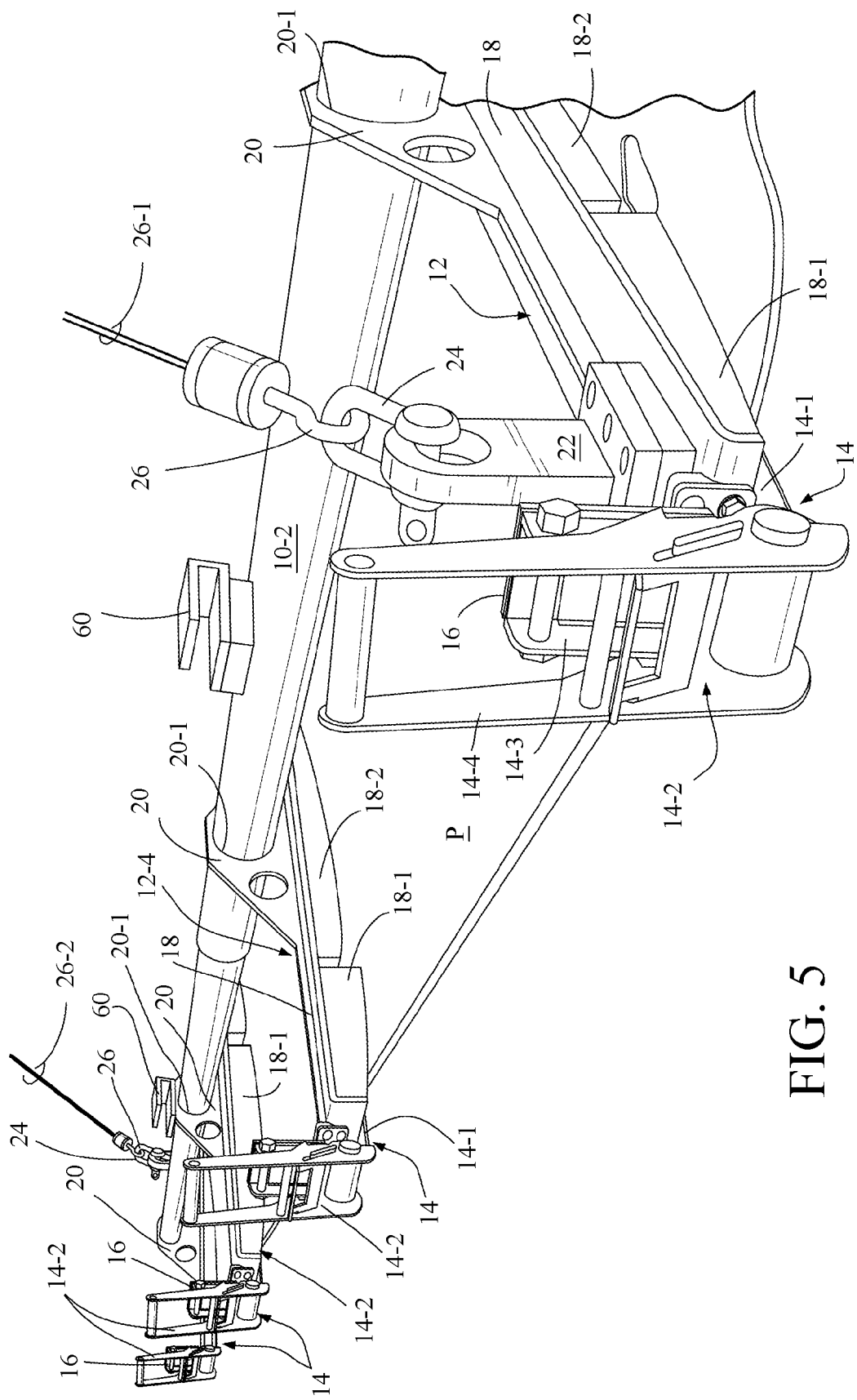
FIG. 5 is a partial top perspective view of the jig assembly and the component part supported thereby.

The jig assembly 10 is perhaps better shown in greater detail in accompanying FIGS. 3-5. As shown, the jig assembly 10 includes a spar assembly comprised of a pair of opposed lateral spar members 10-1, 10-2. Since the jig assembly 10 as shown in the accompanying drawings is especially adapted to support an aircraft wing component as the component part P, the spar members 10-1, 10-2 preferably rearwardly diverge relative to one another so as to conform to the shape of the component part P (in this case a component of a swept aircraft wing). However, it will be appreciated that a single spar and/or other multiple arrangements of spar members could be provided in dependence on the particular geometry of the component part intended to be handled. Suffice it to say, the spar (or spar members) provide an elongate support structure along one of the axes of the component part regardless of its geometry.

A plurality of rib assemblies 12 and 12-1 through 12-4 are provided cross-wise relative to the spar members 10-1 and 10-2. Specifically, in the embodiment depicted, a central rib assembly 12 is provided at the central junction of the spar members 10-1, 10-2, while terminal rib assemblies 12-1 and 12-2 are positioned at the terminal ends of the spar members 10-1 and 10-2, respectively. Intermediate rib assemblies 12-3 and 12-4 are spaced apart along the spar members 10-1 and 10-2 between the terminal rib assemblies 12-1, 12-2 and the central rib assembly 12, respectively.

Each of the rib assemblies 12 through 12-4 are provided with a strap assembly 14 which includes a strap 14-1 and an associated strap ratchet mechanism 14-2 to allow length adjustment (and hence slack removal) of the associated strap 14-1. The straps 14-1 can be of any suitable width and/or material for the particular component part P being supported. Thus, the straps 14-1 may be formed of any conventional synthetic filaments (e.g., nylon, polyolefin, polyester or the like). The strap ratchet mechanism 14-2 is also in and of itself conventional and may be, for example, a mechanism as described in U.S. Pat. No. 2,889,136 to Prete, Jr., U.S. Pat. No. 4,199,182 to Sunesson and U.S. Pat. No. 6,654,987 to Wu, the entire content of each such patent being expressly incorporated hereinto by reference.

One end of each of the straps 14-1 is connected to a rearward end of the associated rib assemblies 12 through 12-4 while the free opposite end of each strap 14-1 is attachable to the respective strap ratchet mechanism 14-2 associated therewith. A base 14-3 of each strap ratchet mechanism 14-2 is fixed to a mounting plate 16 rigidly associated a forward end of each of the rib assemblies 12 through 12-4 so as to allow the handle mechanism 14-4 of the ratchet mechanism 14-2 to be pivotally moved thereby allowing the associated strap 14-1 thereof to be brought under tension thereby securely capturing the component part P against the rib assemblies 12 through 12-4 of the jig assembly 10 (see FIGS. 4 and 5).

Each of the rib assemblies 12 through 12-4 is preferably provided with a rigid spine plate 18 which dependently carries forward and rearward cushion members 18-1 and 18-2 formed of a resilient material (e.g., an elastomeric material). In addition, each of the rib assemblies 12 through 12-4 includes an upright connection flange 20 having an aperture 20-1 which allows the spar members 10-1 and 10-2 to pass therethrough. The connection flange 20 of each of the connection rib assemblies 12 through 12-4 may be rigidly connected to a respective one of the spar members 10-1 and 10-2 at the aperture 20-1. Alternatively the spar members 10-1 and/or 10-2 may be moveably received within the aperture 20-1 of one or more of the connection flanges 20. In such an embodiment, the moveable connection flanges 20 may thus be moveable longitudinally along the spar members 10-1 and 10-2 so as to allow for positional adjustment thereof. In such a manner therefore the jig assembly 10 may be reconfigured to accept a component part P of a different size and/or geometry.

The central rib 12 and the terminal end rib assemblies 12-1, 12-2 are provided with a respective eyelet flange 22 to accept connection with a suitable shackle 24 for engagement with a hook 26 associated with a respective distal terminal end of the suspension support cables 26-1, 26-2 and 26-3. The cables 26-1, 26-2 and 26-3 have respective proximal terminal ends connected to an apex connection 30 which in turn may be connected to a suitable crane or similar hoist device 70. The jig assembly 10 and the component part P supported thereby may thus be suspended by the cables 26-1-26-2 and 26-3 and maneuvered by means of the crane 70 as may be desired.

The central cable 26-1 is operatively associated with a conventional winch assembly 28 and includes a terminal portion 26-1a that may be shortened or lengthened by operation of the winch assembly 28. Preferably, the winch assembly 28 is electrically operated and thus allows the effective length of the central support cable 26-1 between the fixed apex connection 30 and the eyelet flange 22 of the central rib assembly 12 to be varied upon operation thereof. In such a manner therefore the jig assembly 10 and the component part P supported thereby may be positionally reoriented in a manner to be described in greater detail below.

In order to move the jig assembly 10 and the component part P supported thereby physically from one area of the manufacturing process to another, a transport dolly 50 as shown in FIGS. 6-10 may be provided to receive the jig assembly 10. The transport dolly 50 is generally comprised of a platform base 52 which is supported for rolling movement above the ground surface GS by casters 54. The platform base 52 includes a number of upright support posts 56 sized and configured to support the combined weight of the jig assembly 10 and the component part P supported thereby.

Figure 6:
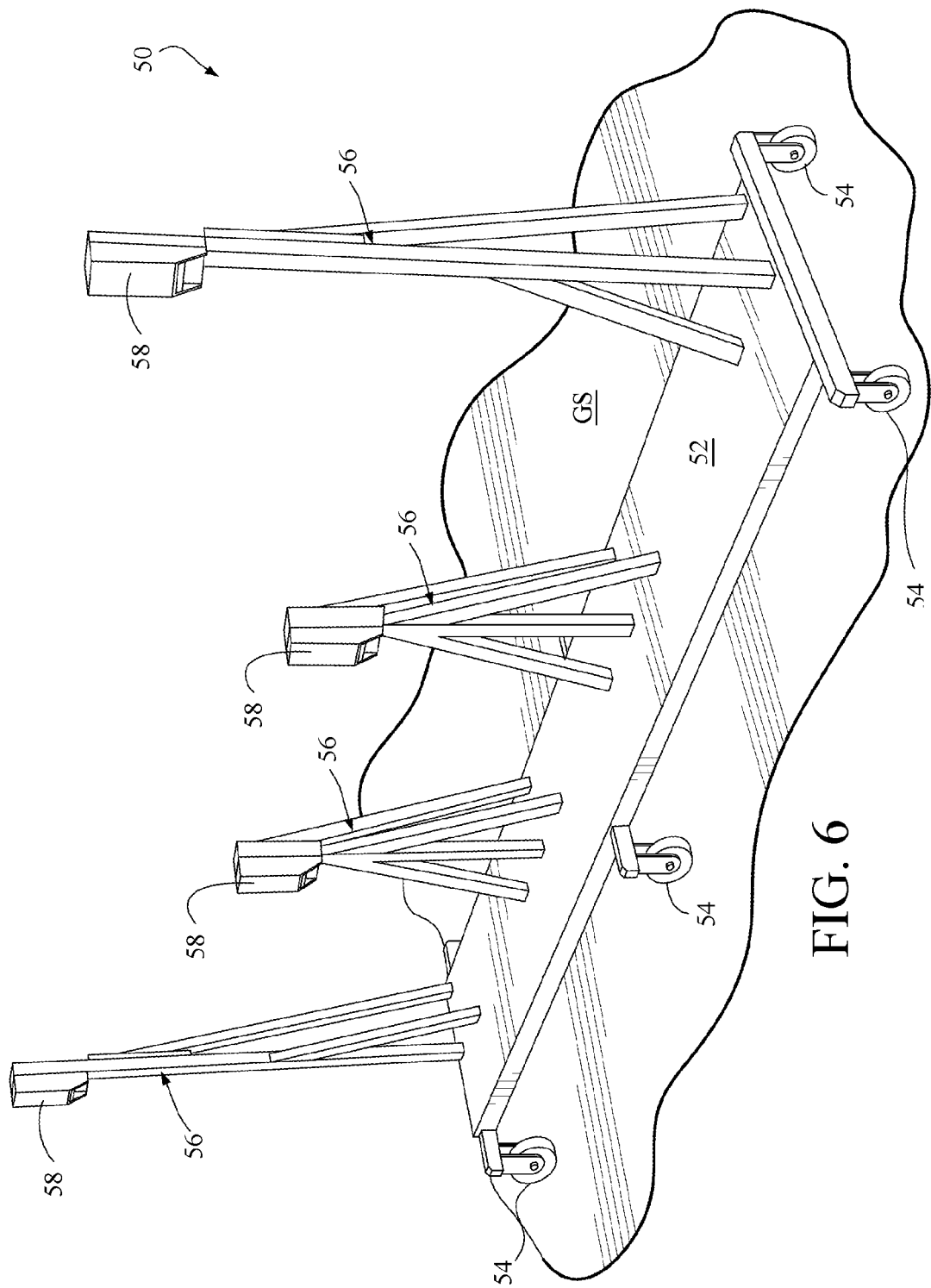
FIG. 6 is a front perspective view of a transport dolly that may be used in combination with the jig assembly to transport the supported component part from one location to another during the manufacturing process.
Figure 7:
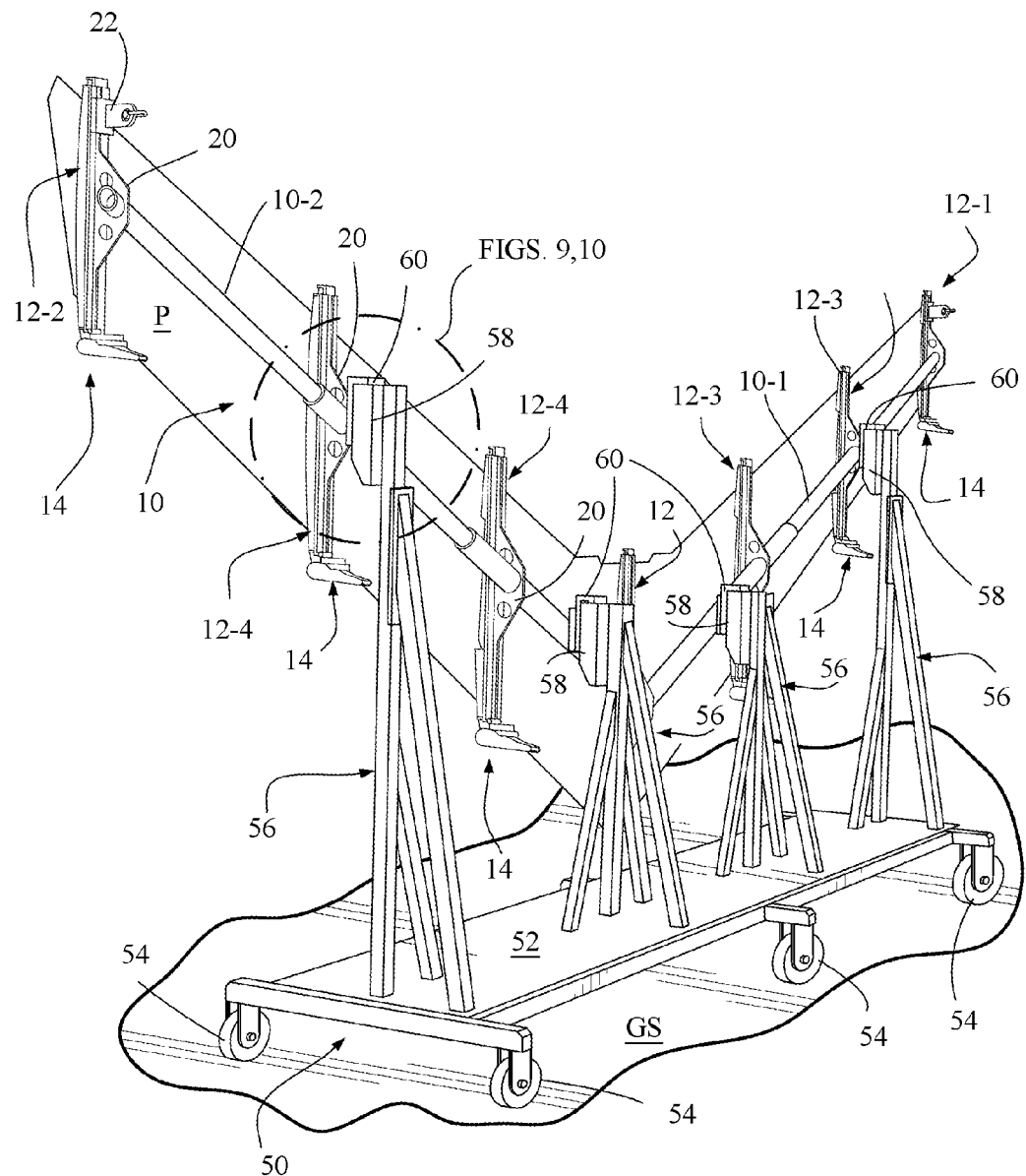
FIG. 7 is a rear perspective view showing the jig assembly and the component part supported thereby coupled to the transport dolly.
Figure 8:
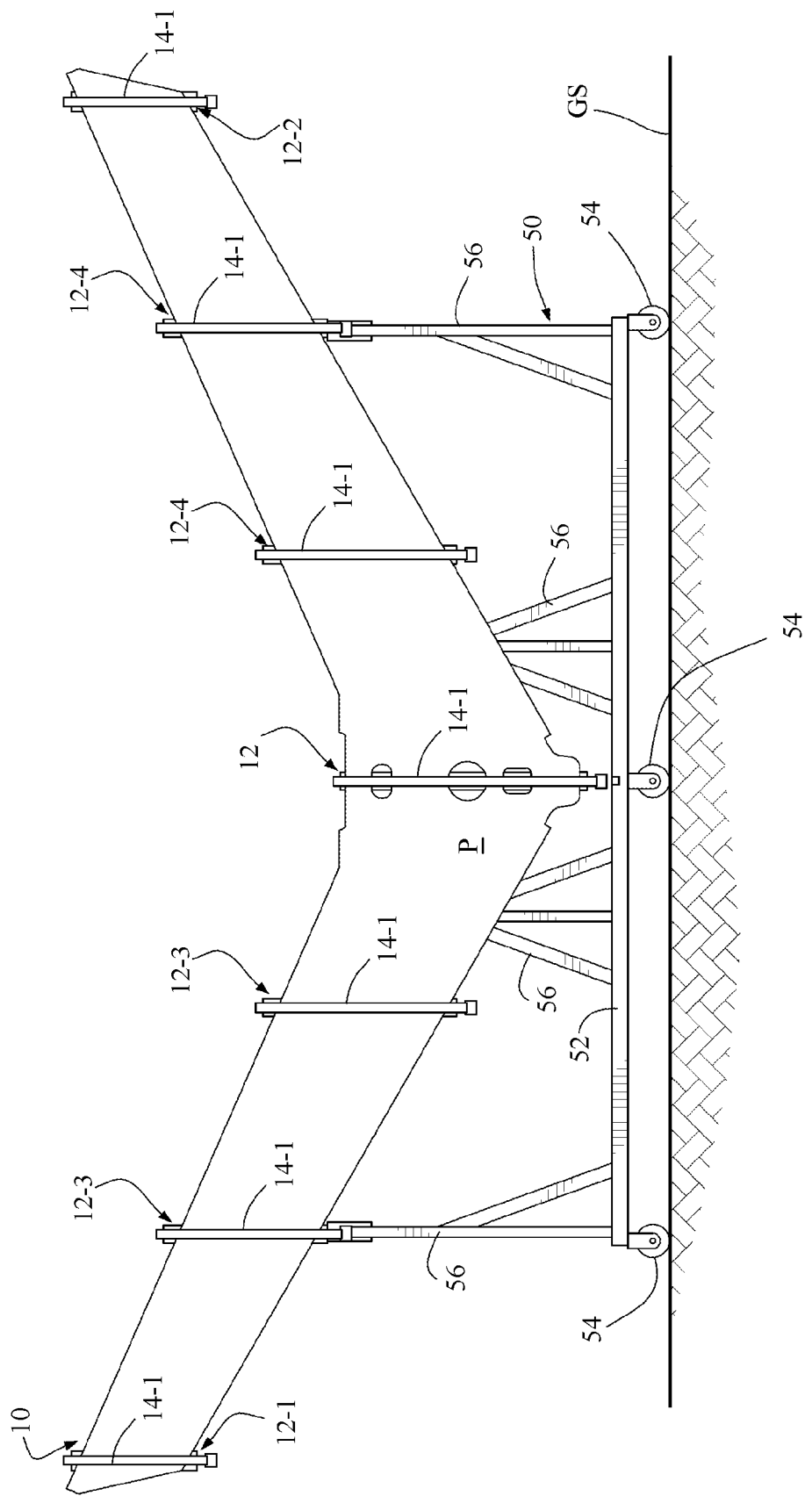
FIG. 8 is a front elevational view of the jig assembly and component part supported thereby coupled to the transport dolly.
Figure 9:
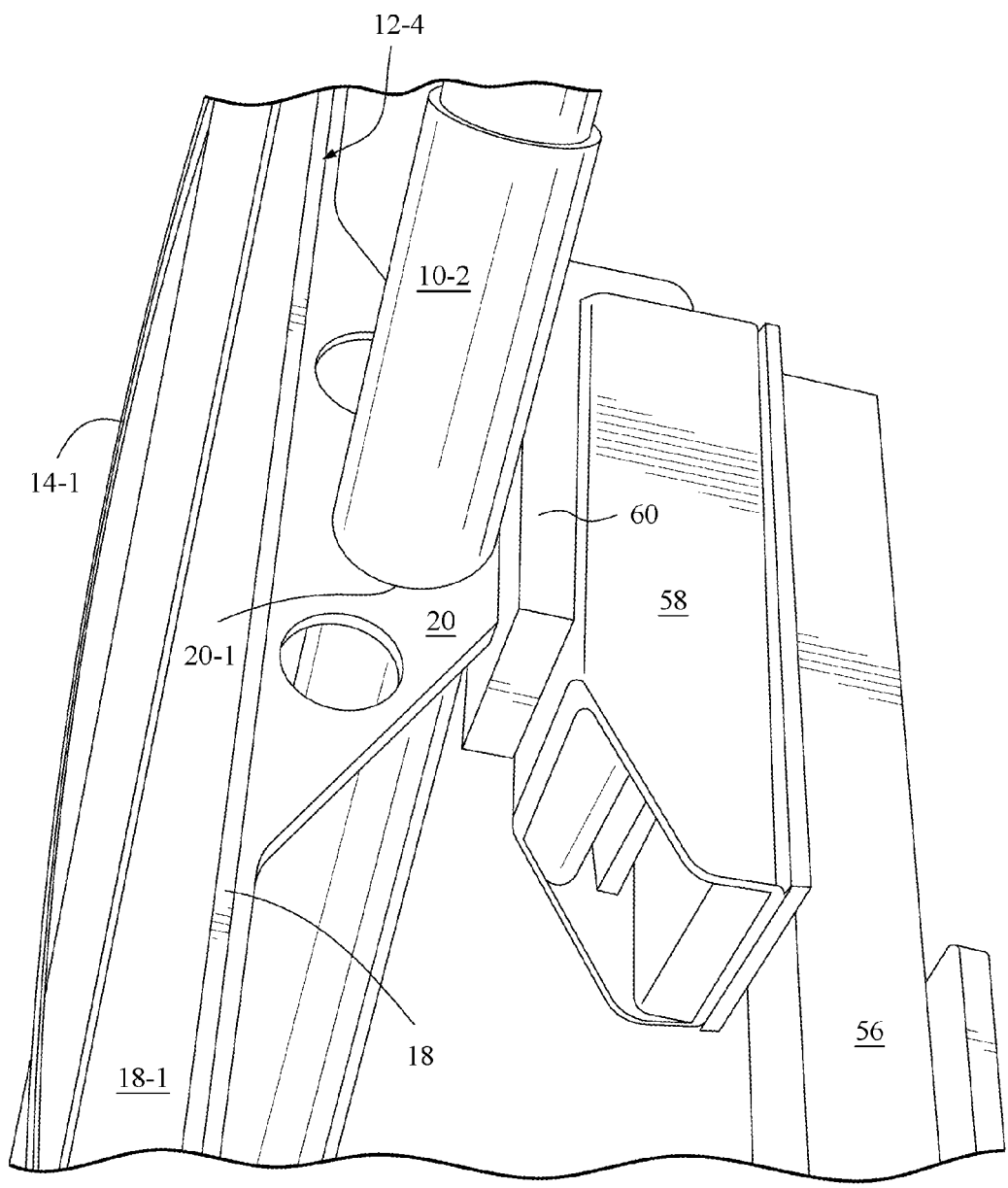
FIG. 9 is a detailed partial bottom perspective view of the jig and dolly coupling assembly as shown in FIG. 7.
Figure 10:
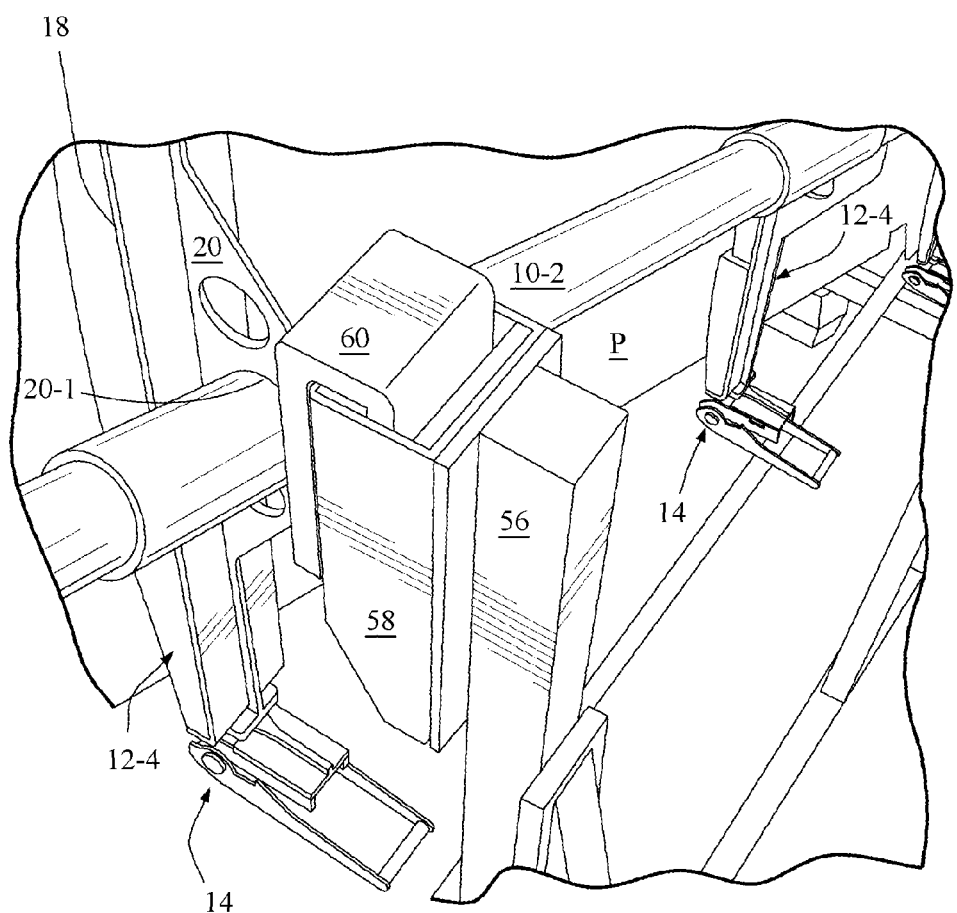
FIG. 10 is a detailed top partial perspective view of the jig and dolly coupling assembly as shown in FIG. 7.

Each of the upright support posts 56 includes at the upper ends thereof a tubular support sleeve 58 which is adapted to receive a respective one of the L-shaped support brackets 60 attached to the spar members 10-1 and 10-2 of the jig assembly 10. In such a manner therefore, the jig assembly 10 and the component part P supported thereby may be coupled to and thus hang from the support posts 56 in a substantially vertical orientation. To achieve this orientation, the relative heights of the support posts 56 are predetermined to accept the specific configuration of the component part P so it is supported in a substantially vertical orientation above the platform base 52. Thus, the heights of the support posts 56 of the transport dolly 50 shown in FIGS. 6-8 are especially adapted for an aircraft wing component part P as shown since the outboard pair of posts 56 have a greater height as compared to the inboard pair of posts 56. Of course, other variations and adaptations may be envisioned by those skilled in the art in dependent upon the geometry and/or size of the jig assembly 10 and the component part P supported thereby.

In use, the straps 14-1 may be removed from their respective ratchet mechanism 14-2 and rib assemblies 12 through 12-4 so a worker can manually slide (using a reciprocal sawing-type motion) each of the straps 14-1 between the component part P and the tooling T. Each of the straps 14-1 may therefore be positioned in registry with a respective one of the rib assemblies 12 and 12-1 through 12-4. One end of each strap 14-1 may be fixed to a rear end of a respective one of the rib assemblies 12 through 12-4 opposite to the ratchet mechanism 14-2 (e.g., by means of cooperating hooks not shown) so that the free end of the strap 14-1 can be operatively engaged with a respective one of the ratchet mechanisms 14-2. Thereafter, the handle 14-4 may be operated so as to take up strap slack until the straps 14-1 are sufficiently tensioned to securely hold the component part P against the rib assemblies 12 through 12-4.

Once the component P is securely captured and held by the straps 14-1 against the rib assemblies 12 through 12-4, the entire jig assembly 10 and component part P held thereby may be hoisted away from the tooling T using any conventional crane or similar hoisting device (identified generally by reference numeral 70 in the FIGURES). Using the crane device 70, a worker may then physically lift, move and reposition the jig assembly 10 and the component part P held thereby.

Figure 11A:
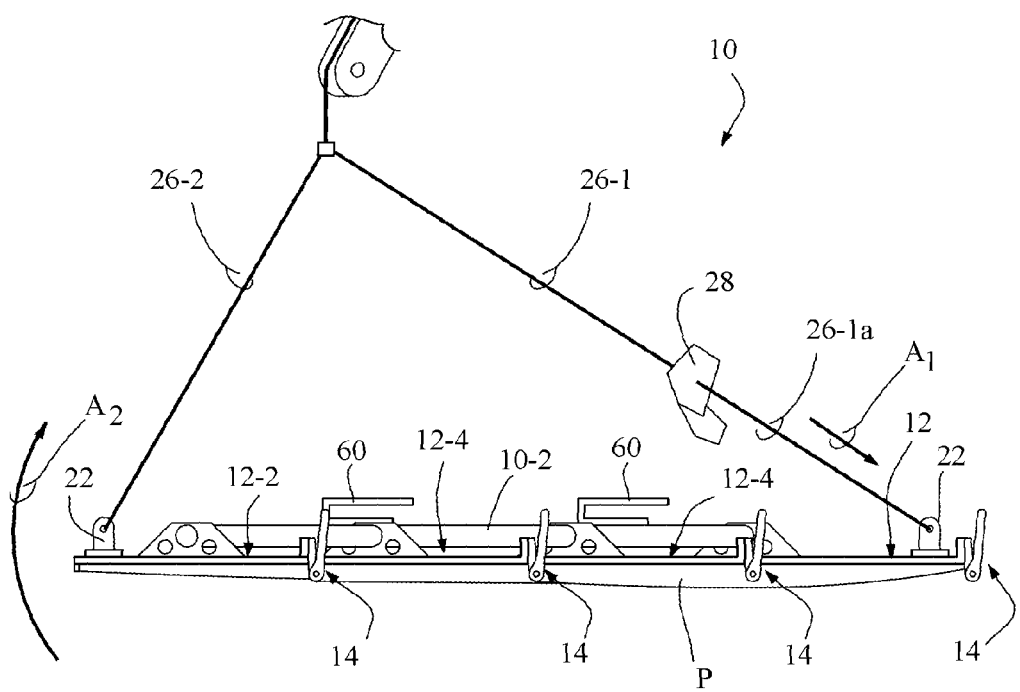
FIGS. 11a through 11d are schematic side elevational views of the jig assembly and the supported component part at different stages of a repositioning sequence relative to the transport dolly.
Figure 11B:
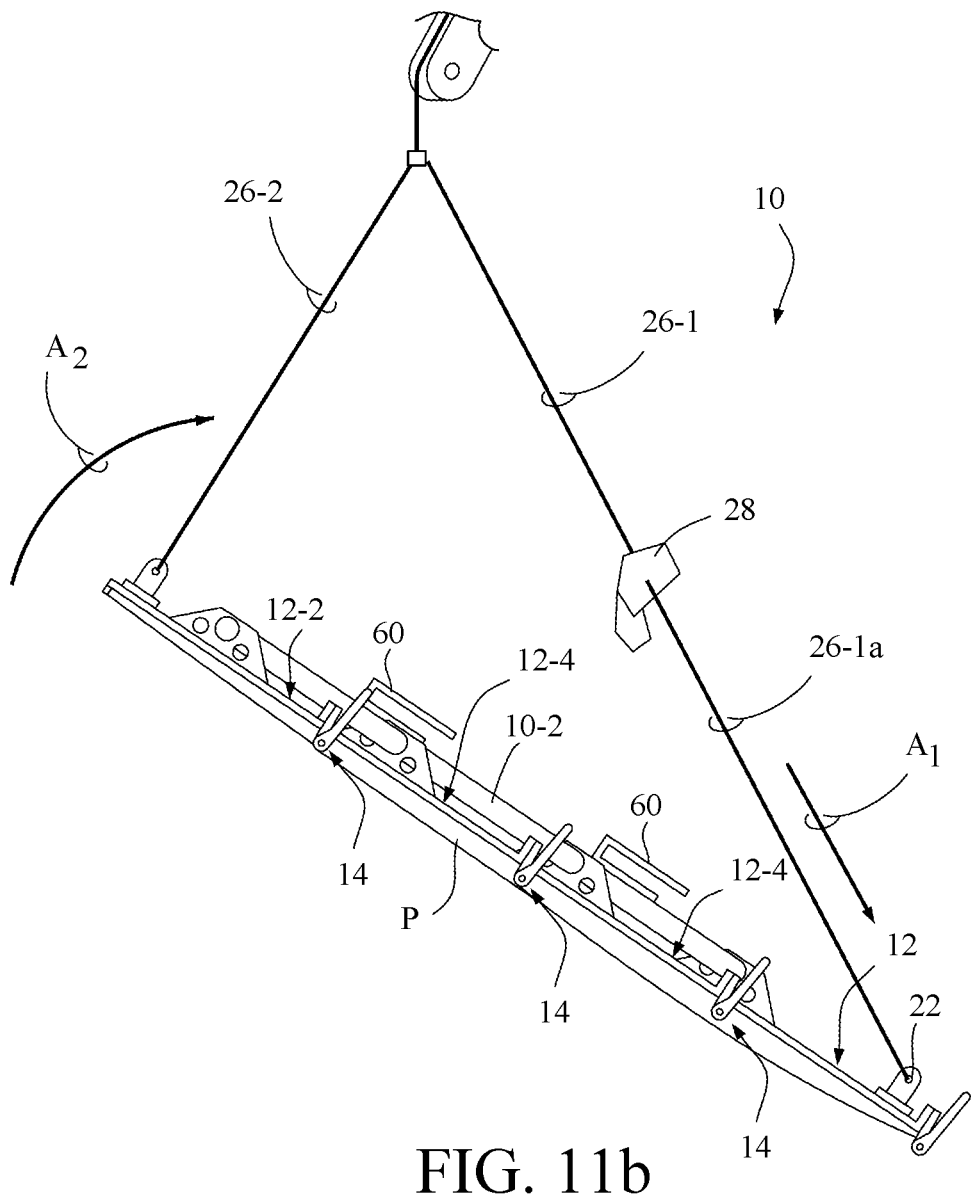
Figure 11C:
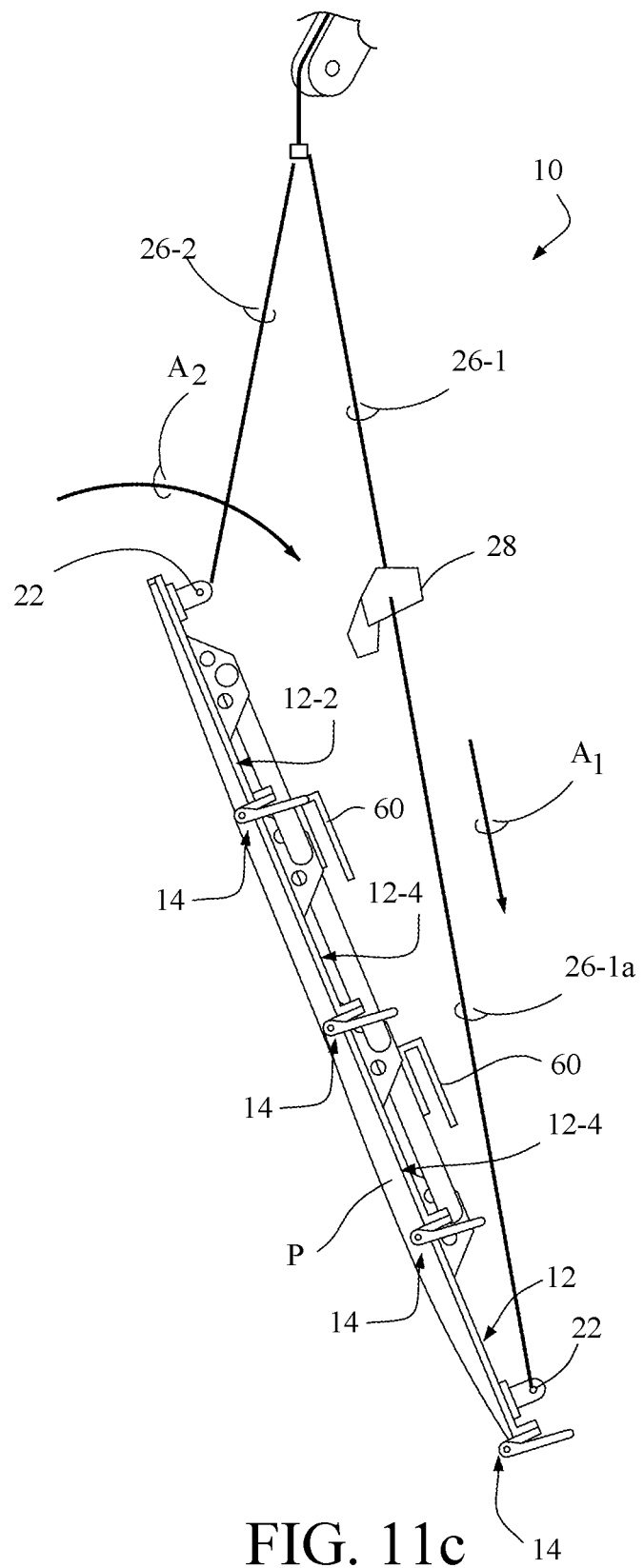
Figure 11D:
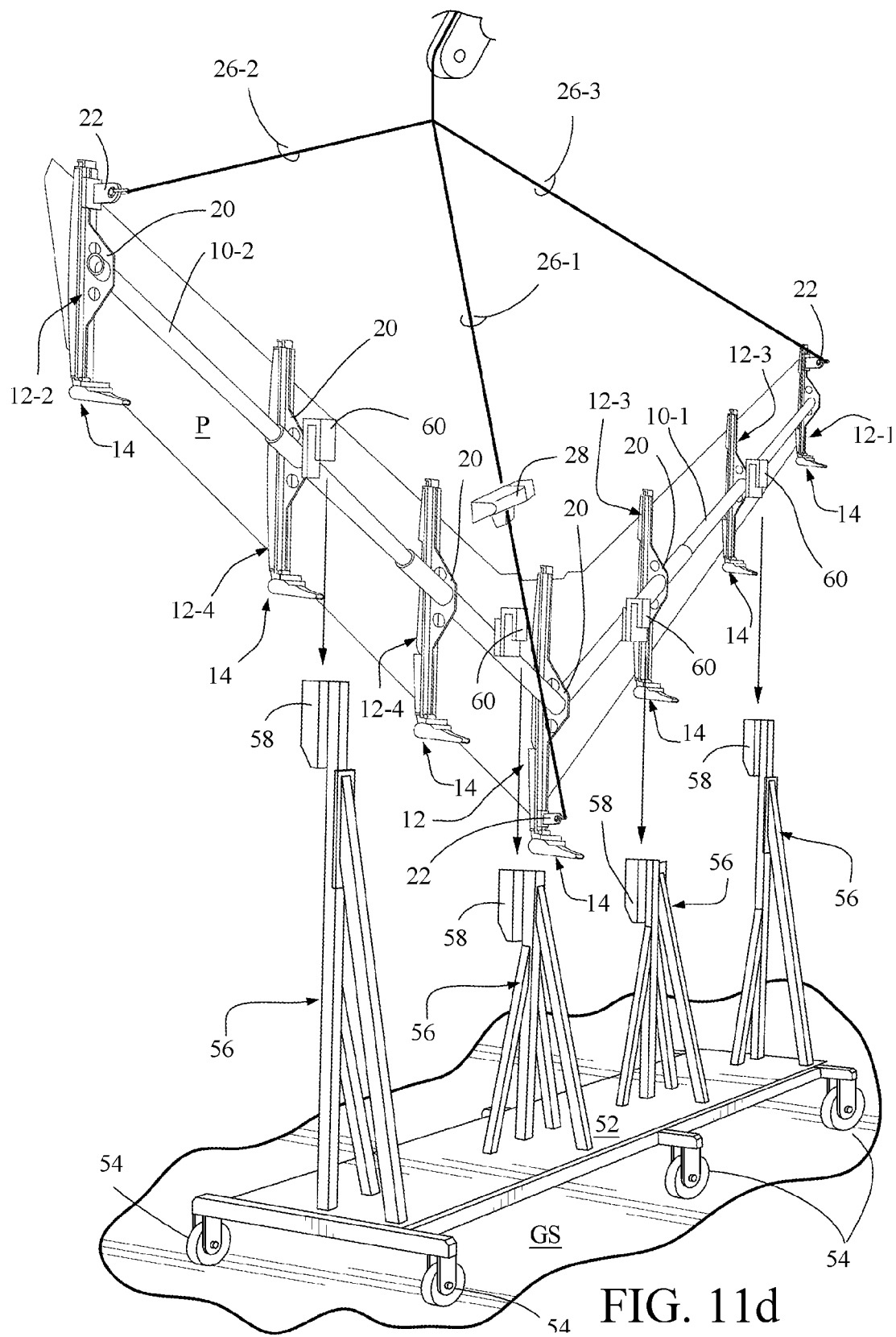

In some instances, it will be desirable for the jig assembly 10 and the component part P held thereby to be mated with the transport dolly 50 as described previously to allow for more convenient transport of the component P to additional processing stations in the fabrication process. Accompanying FIGS. 11a-11d schematically depict such a mating procedure. Specifically, FIG. 11a shows a state whereby the jig assembly 10 and the component part P held thereby is physically separated from the tooling T and is in an essentially horizontal orientation. By operating the winch assembly 28, the cable section 26-1a may be allowed to pay out or lengthen (i.e., in the direction of arrow A1 in FIGS. 11a-11c) thereby causing the jig assembly 10 and the component part P held thereby to be tilted (arrow A2 in FIGS. 11a-11c) more toward a substantially vertical orientation.

Once the jig assembly 10 and the component part P held thereby has been re-oriented to be substantially vertical, the transport dolly 50 may be maneuvered below the assembly 10 (or vice versa using the crane device 70) so that each of the L-shaped support brackets 60 attached to the spar members 10-1 and 10-2 of the jig assembly 10 is aligned with a respective one of the tubular support sleeves 58 associated with the dolly 50. Subsequent lowering of the jig assembly 10 and the component part P held thereby using the crane 70 will therefore cause the L-shaped support brackets 60 to be engaged within a respective tubular support sleeve 58. Once engagement of the support brackets 60 and support sleeves 58 is achieved such that the jig assembly 10 and the component part P supported thereby are physically coupled to the transport dolly 50, the support cables 26-1 through 26-3 may be disconnected from the eyelet flanges 22 of the jig assembly 10 so that the transport dolly 50 and the jig assembly 10 now supported thereby can be maneuvered along the ground surface GS as may be needed. In such a manner therefore, the component part P supported by the jig assembly 10 may be moved about the fabrication process via the transport dolly 50 to allow for further processing thereof.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A jig assembly for supporting a component part comprising:
   an elongate spar assembly ;
   a plurality of rib assemblies attached to the spar assembly;
   a plurality of tensionable strap assemblies operatively associated with the rib assemblies for capturing and holding the component part against the rib assemblies; and
   a support assembly for supporting the jig assembly to allow repositioning of the jig assembly between first and second orientations, wherein the support assembly comprises:
   (a) a plurality of support cables comprising a central support cable and a pair of lateral support cables, each of the support cables having proximal and distal terminal ends, wherein
      (i) the distal end of the central support cable is fixed to a central region of the jig assembly and the distal ends of the lateral support cables are fixed to a respective lateral region of the jig assembly, and wherein
      (ii) the proximal terminal ends of the central and lateral support cables are fixed to an apex connection member; and
   (b) a winch assembly operatively associated with the central support cable so as to change an effective length of the central support cable to thereby responsively reposition the jig assembly between the first and second orientations.

2. The jig assembly as in claim 1, wherein the strap assemblies include a strap ratchet mechanism and a strap, wherein the strap has one end fixed to an end of a respective rib assembly and another end operatively engaged with the strap ratchet mechanism thereof so that operation of the strap ratchet mechanism allows strap slack to be removed thereby tensioning the strap.

3. The jig assembly as in claim 2, wherein the rib assemblies include an upright rigid mounting plate, and wherein the strap ratchet mechanisms include a base fixed to the mounting plate.

4. The jig assembly as in claim 1, wherein the rib assemblies include a spine plate having an upright connection flange connected to the spar assembly.

5. The jig assembly as in claim 4, wherein the rib assemblies include cushion members carried by the spine plate.

6. The jig assembly as in claim 1, further comprising L-shaped support brackets.

7. The jig assembly as in claim 1, wherein the elongate spar assembly comprises a pair of outwardly divergent spar members jointed to one another a central junction thereof.

8. The jig assembly as in claim 7, wherein one of the rib assemblies is positioned cross-wise of the spar assembly at the central junction of the divergent spar members.

9. The jig assembly as in claim 8, wherein a pair of the rib assemblies are end rib assemblies positioned at a respective terminal end of each of the spar members.

10. The jig assembly as in claim 9, wherein at least one rib assembly is positioned crosswise relative to the spar members between the end rib assemblies and the central rib assembly.

11. A combination comprising:
    a transport dolly comprising a plurality of support sleeves, and
    a jig assembly comprising a plurality of L-shaped support brackets received within a respective one of the support sleeves of the transport dolly to removably couple the jig assembly to the transport dolly, wherein
    the jig assembly comprises:
    (i) an elongate spar assembly;
    (ii) a plurality of rib assemblies attached to the spar assembly;
    (iii) a plurality of tensionable strap assemblies operatively associated with the rib assemblies for capturing and holding the component part against the rib assemblies;
    (iv) a plurality of support cables having terminal ends connected to the jig assembly;
    (v) a winch assembly operatively associated with at least one of the support cables so as to change an effective length thereof and thereby responsively reposition the jig assembly between first and second orientations.

12. The combination as in claim 11, wherein the strap assemblies include a strap ratchet mechanism and a strap, wherein the strap has one end fixed to an end of a respective rib assembly and another end operatively engaged with the strap ratchet mechanism thereof so that operation of the strap ratchet mechanism allows strap slack to be removed thereby tensioning the strap.

13. The combination as in claim 12, wherein the rib assemblies include an upright rigid mounting plate, and wherein the strap ratchet mechanisms include a base fixed to the mounting plate.

14. The combination as in claim 11, wherein the rib assemblies include a spine plate having an upright connection flange connected to the spar assembly.

15. The combination as in claim 14, wherein the rib assemblies include cushion members carried by the spine plate.

16. The combination as in claim 11, wherein the elongate spar assembly comprises a pair of outwardly divergent spar members joined to one another at a central junction thereof.

17. The combination as in claim 16, wherein one of the rib assemblies is positioned cross-wise of the spar assembly at the central junction of the divergent spar members.

18. The combination as in claim 17, wherein a pair of the rib assemblies are end rib assemblies positioned at a respective terminal end of each of the spar members.

19. The combination as in claim 18, wherein at least one rib assembly is positioned crosswise relative to the spar members between the end rib assemblies and the central rib assembly.

20. A method of positioning a component part during a manufacturing process comprising:
(a) providing a jig assembly comprising an elongate spar assembly, a plurality of rib assemblies attached to the spar, and a plurality of tensionable strap assemblies operatively associated with the rib assemblies for capturing and holding the component part against the rib assemblies;
(b) strapping a component part to the jig assembly by operating the tensionable strap assemblies; and
(c) moving the jig assembly so as to position the component part strapped thereto by:
(c1) suspending the jig assembly by support cables,
(c2) moving the support cables to position the jig assembly and the component part strapped thereto by operating a winch assembly operatively associated with a central support cable to thereby reorient the jig assembly and the component part strapped thereto between substantially horizontal and substantially vertical positions, and
(c3) lowering the jig assembly into coupling engagement with the transport dolly while the jig assembly and the component part strapped thereto are in a substantially vertical position.

21. The method of claim 20, wherein step (b) includes operating a strap ratchet mechanism so as to tension a strap associated with the strap assemblies and thereby capture the component part between the tensioned strap and the rib assemblies.

22. The method of claim 20, wherein step (c3) comprises engaging L-shaped support brackets of the jig assembly with support sleeves of the transport dolly.

23. The method of claim 20, wherein step (c) includes operating a winch assembly associated with at least one of the support cables so as to change an effective length thereof and cause repositioning of the jig assembly with the component part strapped thereto.

24. The method of claim 23, wherein the winch assembly is operatively associated with a central support cable, and wherein operation of the central support cable causes the jig assembly and the component part strapped thereto to be reoriented between substantially horizontal and substantially vertical positions.

25. A combination comprising:
a jig assembly for supporting a component part; and
a dolly assembly removably coupled to the jig assembly for transporting the jig assembly and component part supported thereby from one location to another, wherein the jig assembly comprises:
(i) an elongate spar assembly;
(ii) a plurality of rib assemblies attached to the spar;
(iii) a plurality of tensionable strap assemblies operatively associated with the rib assemblies for capturing and holding the component part against the rib assemblies;
(iv) a plurality of support cables connected to one another at an apex connection thereof, the support cables including a pair of lateral support cables having terminal ends connected to respective terminal end regions of the jig assembly, and a central support cable connected to a central region of the jig assembly; and
(vi) a winch assembly operatively associated with the central support cable so as to change an effective length thereof and thereby responsively reposition the jig assembly relative to the transport dolly between a first substantially horizontal orientation and a second substantially vertical orientation.

26. The combination according to claim 25, wherein the transport dolly comprises:
a platform base;
casters associated with the platform base to allow for rolling movement across a surface;
a plurality of upright support posts fixed to and extending upwardly from the platform base; and
support sleeves attached to an upper end of the support post.

27. The combination of claim 26, wherein the support sleeves of the transport dolly are tubular.

28. The combination of claim 26, wherein the jig assembly includes L-shaped support brackets received within a respective one of the support sleeves of the transport dolly and thereby removably couple the jig assembly to the transport dolly.

29. A method of positioning a component part during a manufacturing process comprising:
(a) providing a jig assembly comprising an elongate spar assembly, a plurality of rib assemblies attached to the spar, and a plurality of tensionable strap assemblies operatively associated with the rib assemblies for capturing and holding the component part against the rib assemblies;
(b) strapping a component part to the jig assembly by operating the tensionable strap assemblies; and
(c) moving the jig assembly so as to position the component part strapped thereto by:
(c1) suspending the jig assembly by a plurality of support cables comprising a central support cable and a pair of lateral support cables, each of the support cables having proximal and distal terminal ends, wherein the distal end of the central support cable is fixed to a central region of the jig assembly and the distal ends of the lateral support cables are fixed to a respective lateral region of the jig assembly, and wherein the proximal terminal ends of the central and lateral support cables are fixed to an apex connection member,
(c2) reorienting the jig assembly and the component part strapped thereto between substantially horizontal and substantially vertical positions by operating a winch assembly operatively associated with the central support cable to thereby change an effective length of the central support cable and responsively cause the jig assembly to be reoriented between the substantially horizontal and substantial vertical positions, and
(c3) lowering the jig assembly into coupling engagement with the transport dolly while the jig assembly and the component part strapped thereto are in a substantially vertical position.

30. The method of claim 29, wherein step (b) includes operating a strap ratchet mechanism so as to tension a strap associated with the strap assemblies and thereby capture the component part between the tensioned strap and the rib assemblies.

31. The method of claim 29, wherein step (c3) comprises engaging L-shaped support brackets of the jig assembly with support sleeves of the transport dolly.

* * * * *